(12) United States Patent
Timsjo

(10) Patent No.: US 9,454,136 B2
(45) Date of Patent: Sep. 27, 2016

(54) METHOD AND SYSTEM FOR CONTROLLING AN INDUSTRIAL SYSTEM

(71) Applicant: ABB Research Ltd, Zurich (CH)

(72) Inventor: Susanne Timsjo, Vasteras (SE)

(73) Assignee: ABB Research Ltd., Zurich (CH)

( * ) Notice: Subject to any disclaimer, the term of this patent is extended or adjusted under 35 U.S.C. 154(b) by 426 days.

(21) Appl. No.: 14/057,515

(22) Filed: Oct. 18, 2013

(65) Prior Publication Data

US 2014/0046458 A1 Feb. 13, 2014

Related U.S. Application Data

(63) Continuation of application No. PCT/EP2011/056259, filed on Apr. 19, 2011.

(51) Int. Cl.
*G05B 9/02* (2006.01)
*G05B 19/409* (2006.01)
*G05B 23/02* (2006.01)

(52) U.S. Cl.
CPC ............... *G05B 9/02* (2013.01); *G05B 19/409* (2013.01); *G05B 23/0267* (2013.01); *G05B 2219/35444* (2013.01); *G05B 2219/36153* (2013.01); *G05B 2219/36168* (2013.01)

(58) Field of Classification Search
USPC .................................... 700/28, 117; 709/249
See application file for complete search history.

(56) References Cited

U.S. PATENT DOCUMENTS

| | | | |
|---|---|---|---|
| 5,353,400 A * | 10/1994 | Nigawara | G05B 23/0272 715/771 |
| 5,631,825 A | 5/1997 | van Weele et al. | |
| 5,777,896 A | 7/1998 | Arita et al. | |
| 7,017,116 B2 * | 3/2006 | Elsbree | G06F 8/38 715/740 |
| 2002/0054107 A1 * | 5/2002 | Paunonen | G05B 23/0272 715/764 |
| 2002/0077728 A1 | 6/2002 | Fukuda et al. | |
| 2006/0069459 A1 * | 3/2006 | Retlich | G05B 23/027 700/108 |
| 2008/0004725 A1 * | 1/2008 | Wacker | F24F 11/0009 700/83 |
| 2008/0300698 A1 * | 12/2008 | Havekost | G05B 19/0426 700/83 |
| 2009/0043415 A1 * | 2/2009 | Sun | G05B 19/4183 700/117 |
| 2009/0064019 A1 * | 3/2009 | Cahill | G05B 15/02 715/765 |
| 2010/0114337 A1 * | 5/2010 | Husoy | G06F 9/4443 700/17 |

OTHER PUBLICATIONS

International Preliminary Report on Patentability Application No. PCT/EP2011/056259 Completed: May 16, 2013 11 pages.
International Search Report & Written Opinion of the International Searching Authority Application No. PCT/EP2011/056259 Completed: Jan. 31, 2012; Mailing Date: Feb. 14, 2012 10 pages.

* cited by examiner

*Primary Examiner* — Kidest Bahta
(74) *Attorney, Agent, or Firm* — Whitmyer IP Group LLC

(57) ABSTRACT

A method of controlling an industrial system by a control system including a user interface having a main display arranged to provide a status view of at least a portion of the industrial system and a secondary display enabling user interaction with the industrial system and the main display. The method includes: receiving an alert concerning a status change in a part of the industrial system; displaying, on the secondary display, an alert object associated with the part of the industrial system generating the alert; detecting a selection of the alert object based on gesture-based user input; displaying the alert object on the main display; receiving an adjustment command of a parameter via gesture-based user input, the parameter being associated with the part of the industrial system generating the alert; adjusting the parameter based on the adjustment command; and controlling the part generating the alert based on the adjusted parameter.

16 Claims, 3 Drawing Sheets

METHOD AND SYSTEM FOR CONTROLLING AN INDUSTRIAL SYSTEM

FIELD OF THE INVENTION

The present invention generally relates to an industrial system and in particular to the control of an industrial system. To this end, a method, a computer program product and a control system is provided for controlling an industrial system.

BACKGROUND OF THE INVENTION

Industrial control systems, process control systems, Supervisory Control and Data acquisition (SCADA) systems and the like have displays for displaying a graphic diagram of the industrial system to operators monitoring the industrial system.

Operators may thereby be able to recognize an alarm or a trend in the industrial system and, as a result, take measures to solve the problem giving rise to the alarm or trend.

Existing industrial system control systems have several drawbacks, including having user interfaces which are non-intuitive and which provide strain injuries to the operators.

U.S. Pat. No. 5,777,896 A discloses an apparatus for operating and monitoring a plant. The apparatus has a manipulating device which provides the plant with manipulation signals for operating the plant. In response to information supplied from the plant and a manipulating signal of the manipulating device, a first display data producing device produces first display data needed for the operation of the plant changing every moment. On the basis of data supplied from the first display data producing device, a first display device displays information relating to the operation of the plant. In response to information supplied from the plant and a manipulating signal of the manipulating device, a second display data producing device produces data needed for monitoring the plant. On the basis of data supplied from the second display data producing device, a second display device displays information relating to the monitoring of the plant on a larger display screen than that of the first display device. Information displayed by the first display device and information displayed by the second display device complement each other and make it possible to accurately operate and monitor the plant.

SUMMARY OF THE INVENTION

A general object of the present disclosure is to provide a method and a control system which improves the work environment of system operators.

Another object of the present disclosure is to enable intuitive system alert handling routines, thereby reducing the time to handle alerts in the industrial system.

Hence, in a first aspect of the present disclosure there is provided a method of controlling an industrial system by means of a control system comprising a user interface having main display means arranged to provide a status view of at least a portion of the industrial system and secondary display means enabling user interaction with the industrial system and the main display means, wherein the method comprises:

receiving an alert concerning a status change in a part of the industrial system, displaying, on the secondary display means, an alert object associated with the part of the industrial system generating the alert, detecting a selection of the alert object based on gesture-based user input, displaying the alert object on the main display means, receiving an adjustment command of a parameter via gesture-based user input, the parameter being associated with the part of the industrial system generating the alert, adjusting the parameter based on the adjustment command, and controlling the part generating the alert based on the adjusted parameter.

Gesture based user interaction is to be construed as user-input provided via a touch-screen, or other gesture based user interaction, for instance via bodily movements detected by means of 3-d cameras and appropriate computer vision software. Gesture-based user-interaction is not to be construed as user input via a hardware mouse or a hardware keyboard, although the methods presented herein may also be utilized by means of hardware user-input devices such as a hardware mouse or a hardware keyboard.

By means of the interaction between the main display means and the secondary display means via gesture-based user-interaction, industrial system alarms and alerts may beneficially be handled rapidly and intuitively. Furthermore, the gesture-based interaction provides for less static strain to users, whereby work-related injuries may be avoided to a larger degree than in the prior art.

The step of adjusting may be carried out via the secondary display means.

One embodiment may comprise displaying on the secondary display a main object representing the industrial system, and altering the appearance of the main object in response to receiving the alert.

One embodiment may comprise displaying on the secondary display means at least one node in a hierarchical structure in which the main object forms the root thereof, each displayed node being displayed as a result of gesture based navigation in the hierarchical structure, wherein each node represents a part of the industrial system, and the appearance of each node which is related to the part of the industrial system generating the alert is distinct from any node which is not related to the alert.

Thereby a user may easily localize the part of the industrial system generating the alert, whereby measures may be taken to handle the alert, while also providing an overview of a particular portion of the industrial system, e.g. all the nodes associated with the node corresponding to the part of the industrial system generating the alert.

One embodiment may comprise selecting an end node in the hierarchical structure corresponding to the part in the industrial system generating the alert.

One embodiment may comprise altering the appearance of any node related to the alert in response to the step of controlling. Thereby the nodes will obtain a normal state appearance.

The secondary display means may be a touch screen device having multi-touch functionality.

One embodiment may comprise magnifying the alert object on the main display means by means of gesture based user-interaction. A user may thereby be provided with a detailed view of the representation of the part which is subject to the alert.

The magnifying may be provided via the secondary display means.

One embodiment may comprise displaying an at least semi-transparent layer on the main display means on top of the status view.

One embodiment may comprise displaying, on the at least semi-transparent layer, an application providing information pertaining to the part of the industrial system associated with the alert. A user may hence be able to monitor the displayed parts on the main display means while being provided with additional system information via the application.

One embodiment may comprise displaying an adjustment of the parameter on the main display means.

In a second aspect of the present disclosure there is provided a computer program product comprising a computer readable medium storing a computer program, which when executed performs the method according to the first aspect.

In a third aspect of the present disclosure there is provided a control system for an industrial system, which control system comprises:
 input means arranged to receive an alert concerning a status change in a part of the industrial system,
 main display means arranged to provide a status view of at least a portion of the industrial system, and
 secondary display means enabling user interaction with the industrial system and the main display means, which main display means and secondary display means form a user interface of the control system, which secondary display means is arranged to display an alert object associated with the part of the industrial system generating the alert,
wherein control system is arranged to:
 detect a selection of the alert object based on gesture-based user input;
 display the alert object on the main display means, to receive an adjustment command of a parameter via gesture-based user input, the parameter being associated with the part of the industrial system generating the alert;
 adjust the parameter based on the adjustment command; and
 control the part generating the alert based on the adjusted parameter.

The secondary display means may be a touch screen device having multi-touch functionality, arranged to detect the gesture-based user input.

Additional features and advantages will be disclosed in the following.

BRIEF DESCRIPTION OF THE DRAWINGS

The invention and the advantages thereof will now be described by way of non-limiting examples, with reference to the accompanying drawings of which.

DETAILED DESCRIPTION OF THE INVENTION

In the following description, for purpose of explanation and not limitation, specific details are set forth, such as particular techniques and applications in order to provide a thorough understanding of the present disclosure. However, it will be apparent for a person skilled in the art that the present disclosure may be practiced in other embodiments that depart from these specific details. In other instances, detailed description of well-known methods and apparatuses are omitted so as not to obscure the description with unnecessary details.

Figure 1:
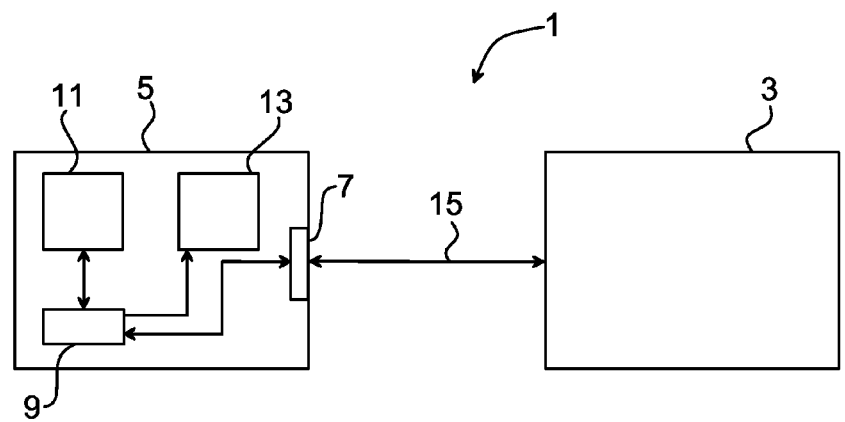
FIG. 1 is schematic block diagram of an industrial system connected to a control system.

FIG. 1 shows a schematic view of an arrangement 1 comprising an industrial system 3 connected to a control system 5. The industrial system 5 may for instance be a system in the process industry such as an oil refinery, a power plant, a chemical plant, a food processing plant or the like.

The control system 5 is arranged to receive status information in the form of status data from the industrial system 3 via a connection 15. The control system 5 is arranged to provide control commands in the form of control command data to the industrial system 3 to control the industrial system 5. Typically, a user such as an operator or control engineer may provide user input to the control system 5 whereby the control system 5 provides the control command to the industrial system 3.

The connection 5 may allow bi-directional data communication. The connection 5 may thus provide status data from the industrial system 3 to the control system 5. The connection 5 may also provide control command data from the control system 5 to the industrial system. Alternatively, communication between the control system 5 and the industrial system 3 may be provided via parallel data connections, one for each communications directions.

The control system 5 comprises a communications interface 7 comprising input means for receiving status data from the industrial system 3. The communications interface 7 may also comprise output means for providing control command data to the industrial system 3.

The control system 5 further comprises a processor 9, main display means 13, and secondary display means 11. The main display means 13 and the secondary display means 11 define a user interface of the control system 5.

The secondary display means 11 and the main display means may both be arranged to be able to communicate with the processor 9. The processor 9 comprises software for carrying out the methods disclosed herein.

It is to be noted that in variations of the present disclosure the processor may be integrated with one of the main display means and the secondary display means. Alternatively, the processor may be arranged as a separate unit with respect to the main display means and the secondary display means, as illustrated in FIG. 1.

The control system 5 may in one embodiment be based on the 800xA automation platform provided by ABB® for functional integration of the industrial system 3 and the control system 5.

The control system may comprise one or more main display means 13. Alternatively, the main display means 13 may be formed of several individual display means to thereby provide a partitioned view of the industrial system 3.

The main display means 13 may in one embodiment be a large main monitoring display, such as those generally utilized in the control room of an industrial process, and which provide information which simultaneously may be monitored by several control engineers or operators working in the control room.

The control system normally comprises a plurality of secondary display means. To this end, each control engineer or operator may in general utilize an individual secondary display means 11. In one embodiment, each secondary display means 11 individually enables interaction with the main display means 13 and with the industrial system 3. Thus, user interaction via any of the secondary display means 11 provides interaction with the main display means 13 and the industrial system 3.

The secondary display means 11 is arranged to provide user-interaction via gesture based user input. With user-interaction is meant interaction between a user and the secondary display means 11. As a result, a user may by means of gesture-based user input via the secondary display means 11 interact with the main display means 13 and the industrial system 3.

The secondary display means 11 may in one embodiment be a touch-screen device. The secondary display means 11 may in one embodiment have multi-touch functionality enabling user interaction with one or more finger(s) or stylus type device(s) simultaneously.

Alternatively, the control system may comprise other means for detecting and recognizing gesture based navigation. Such means may for instance provide detection and recognition of bodily gestures, e.g. gestures by face or hand of an operator or control engineer. The means may be implemented for instance by means of one or more 3-d camera(s) and by appropriate computer vision software for processing and interpreting input data received by the said means.

The secondary display means 11 may for instance be a flat-screen display device which may be arranged horizontally on a structure providing support to the secondary display means, with its display screen being essentially parallel with the support structure. Alternatively, the secondary display means may be arranged such that the display screen is substantially perpendicular, e.g. vertical, with respect to the support structure supporting the secondary display means.

Figure 2:
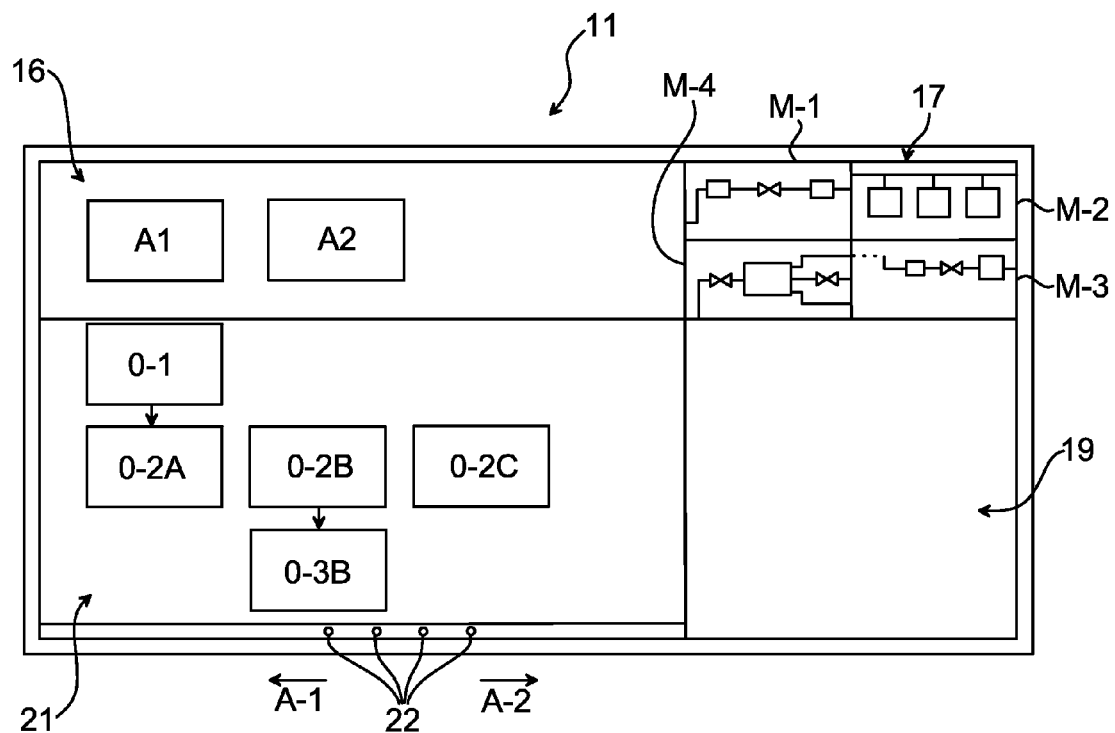
FIG. 2 is a schematic view of display view of a secondary display means.

FIG. 2 shows an example of a display view of the secondary display means 11.

The display view provides a view of an alarm or alert area 16, a main display means view area 17, here exemplified by a four-part split view of portions M-1, M-2, M-3, and M-4, a display view manipulating area 19, which in one embodiment is a multi-touch area, and a structural view area 21 presenting a view of the industrial system 3. The structural view area 21 may be presented as a hierarchical structure with a main object O-1 being displayed, which main object O-1 represents the industrial system.

The alarm or alert area 16, the main display means view area 17, the display view manipulating area 19 and the structural view area 21 and their functioning will now be described in more detail.

In a step S2, after a step S1 described herebelow, the alarm or alert area 16 provides a view of an alarm or alert object A1 and A2, each being associated with an alarm or alert in a respective part of the industrial system 3. An alarm or alert may for instance be generated due to a pressure or temperature change in a reactor or boiler portion of a power plant.

An alarm or alert is provided to the secondary display means 11 via the connection 15 from the industrial system 3 in a first step S1. A user may select the alarm or alert object A1 and/or A2 in the alarm or alert area 16, wherein the selection is detected in a step S3 by the secondary display means 11. By selecting any of the alarm/alert objects A1,A2, the main display means 13 may in a step S4 be updated such that it displays an object representing that part of the industrial system 3 which generates the alarm or alert.

In the four-split view of the main display means view area 17, a user can select which one of the screen portions of the main display means 13 is to be updated in response to selecting the alarm or alert in the alarm or alert area 16.

Figures 4A, 4B:
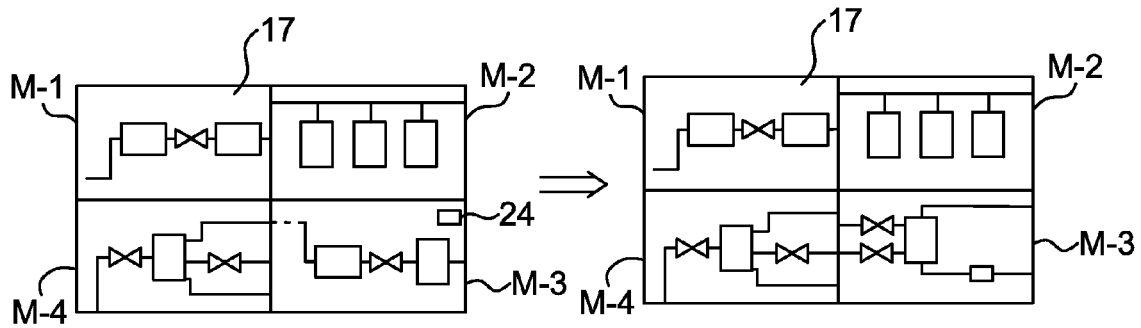
FIGS. 4A-B shows an example of a display view of the secondary display means.
Figure 5:
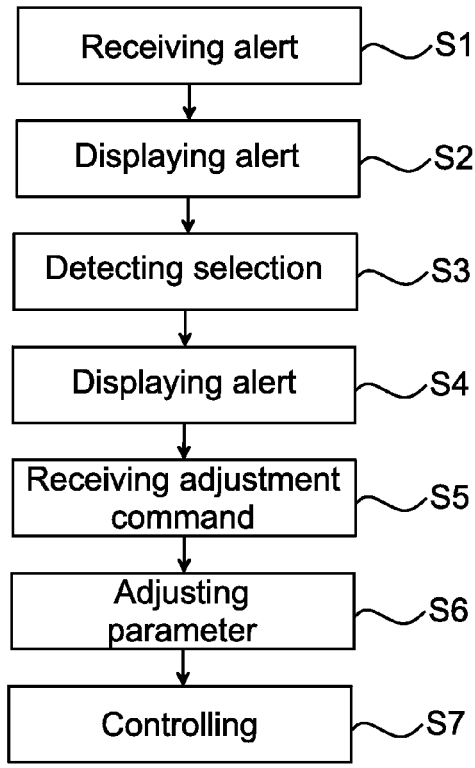
FIG. 5 is a flowchart of a method of controlling the industrial system in FIG. 1.

As can be seen in FIGS. 4a-b, which shows an example of a configuration of the main display means view area 17, a selection item 24 is shown in the portion M-3. A user may via gesture based user interaction select which portion M-1, M-2, M-3 and M-4 is to be updated automatically when interacting with the secondary display means 11. In the example in FIGS. 4a and b, the portion M-3 has thus been pre-selected as being the default screen portion to be updated upon e.g. an alarm or alert selection in the step S3.

The selection item 24 may be set for selecting any of the portions M-1, M-2, M-3 and M-4 as a default portion to be updated when the user interacts with the secondary display means 11. As mentioned above, the user, e.g. the operator or control engineer, may decide which screen portion or screen view of the main display means 13 is to be updated in case of e.g. an alarm or alert. As a result, the user can decide which screen portion is to be left unaltered upon user-interaction with the secondary display means 11. The user will thereby be able to continue to monitor those portions of the industrial system 3 which are of current interest.

FIG. 4b shows an update of the screen portion M-3 upon user-interaction with the secondary display means 11. In particular, a different part of the industrial system 3 is shown when an update is performed of the screen portions M-1, M-2, M-3 and M-4 as a result of e.g. an alarm or alert which has been selected by a user in step S3 for alert handling purposes.

Returning to FIG. 2, the main display means view area 17 shows the portions M-1, M-2, M-3 and M-4, which may be user-selected parts of the industrial system. Such representations of user-selected parts may for instance be turbines and cooling systems and valves thereof of a power plant.

The display view manipulating area 19 may for instance be used for magnifying and panning. A user may perform gestures in the form of for instance pinching for magnifying and panning effects. A user may select a part of the industrial system represented on the main display means 13, in the present example provided by one of the portions M-1, M-2, M-3 or M-4. Gesture-based user-interaction in the display view manipulating area 19 provides magnifying, panning or scrolling effect to the part represented in a selected portion M-1, M-2, M-3 or M-4. The magnifying/panning effect(s) is displayed on the main display means 13. Such selection may be obtained as described above with reference to FIGS. 4a and 4b.

The structural view area 21 provides a hierarchical tree structure view of the industrial system 3 via a main object O-1 which forms the root of the hierarchical structure. By means of gesture-based navigation, a user may navigate through the hierarchical structure. In one embodiment, each node O-2A, O-2B, O-2C, O-3B, or alternatively each hierarchical structure level, is presented on the secondary display means 11 gradually, in response to the user navigating through the hierarchical structure. Thus, a user may via gesture-based interaction navigate through a specific visualized path in the hierarchical structure.

Each node of the hierarchical structure corresponds to a part of the industrial system 3. The main object O-1 representing the root may in one embodiment correspond to the industrial system on a highest representation level. Each lower level node corresponds to particular parts of the industrial system. An end node, such as node O-3B, is a node which presents a lowest level representation of the industrial system. As an example, a highest level representation may be a nuclear power facility, wherein the lowest level may be a cooling system for a specific generator in the nuclear power facility.

In one embodiment, the appearance of nodes in the hierarchical structure is altered upon receiving an alert or alarm from a part of the industrial system. In particular, the appearance of the nodes which are associated with the part generating the alarm or alert is altered. Thereby a user may be provided with a visual guidance for localizing the alarm or alert in the industrial system, as shown in FIGS. 3a-3c.

Figure 3A:
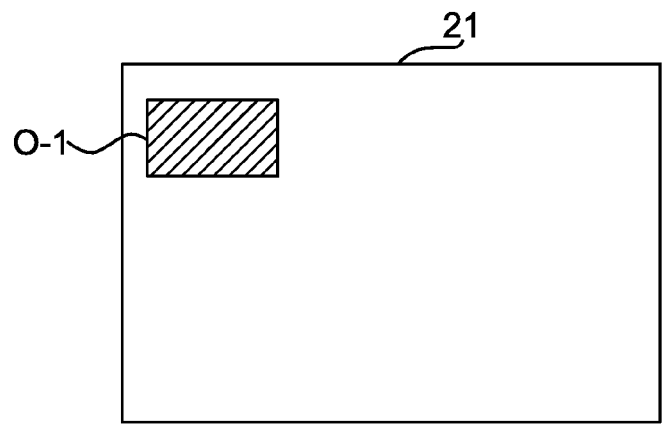
FIGS. 3A-C shows an example of navigation via the secondary display means.
Figure 3B:
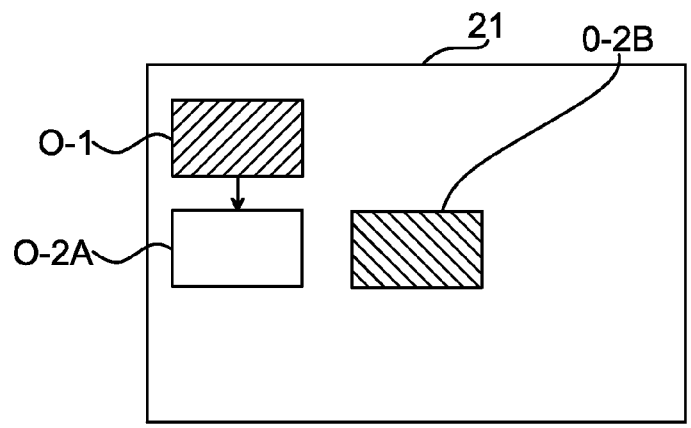
Figure 3C:
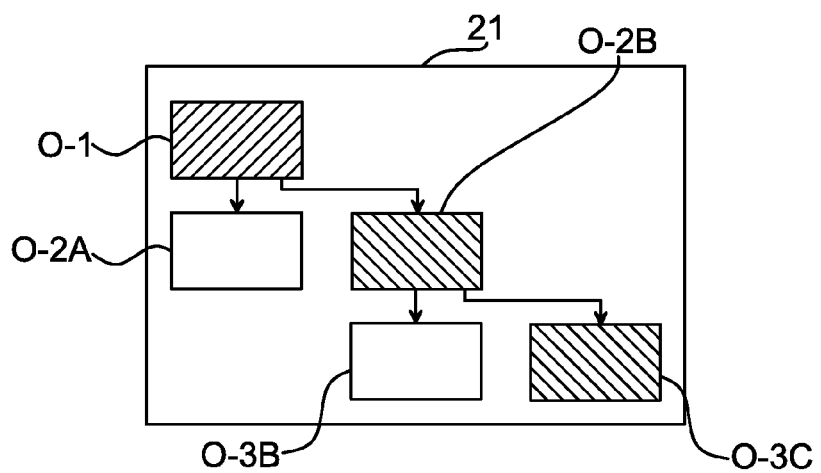

In FIGS. 3a-c it is also shown how the alarm path is visualized on the secondary display means 11 step by step as a user navigates through the hierarchical structure. The part of the industrial system 3 which generates the alert is visualized as an alert object O-3C in an end node of the hierarchical structure. For a touch-screen embodiment the user can drag their finger across the display of the secondary display means 11, wherein the hierarchical structure expands in response to the movement of the finger along the display screen, as shown stepwise in FIGS. 3a, 3b, and 3c.

In one embodiment, at least one of the alarm or alert area 16, the main display means view area 17, the display view manipulating area 19 and the structural view area 21 can be selectively changed to display additional applications. In the example of FIG. 2, application indicators 22 are presented in the display view. By gesture-based user interaction e.g. left or right gestures as indicated by arrows A-1 and A-2 respectively, a user may toggle through the applications and select any of the available application, of which one is the structural view area 21.

In one embodiment, a user-selection of one of the nodes in the hierarchical structure results in a direct jump, i.e. a shortcut, to one of the additional applications, which otherwise would have necessitated toggling through the different applications, as described above. Such a shortcut e.g. via an end node corresponding to the part in the industrial system which generates the alarm or alert may for instance direct the user to a control application which allows adjustment of a parameter associated with the part of the industrial system generating the alarm or alert. The user may thereby by means of gesture-based user interaction with the control application adjust the parameter of the part generating the alarm or alert. The control system 5 may hence in a step S5 receive an adjustment command of the parameter. The adjustment command results in the parameter being adjusted in a step S6. In a step S7 the part generating the alarm or alert may be controlled based on the adjusted parameter. Thereby the cause of the alarm or alert may be removed.

In one embodiment, the user may select any of the portions M-1, M-2, M-3 or M-4 via gesture-based user interaction whereby a corresponding tree structure in the hierarchical structure will be highlighted in the structural view area 21. Thus, a user may in a simple manner obtain information of which part of the industrial system is displayed on the main display means 13, and how that part is related to at least some other parts, i.e. higher level nodes, of the industrial system 3.

In one embodiment, one of the additional applications selectable via the secondary display means 11 by toggling left or right according to arrows A-1 or A-2, is a dashboard application. The dashboard application, when selected, provides an at least semi-transparent layer on top of the view of the industrial system presented on the main display means 13. Non-transparent applications in the form of widgets relating e.g. to the status of or to general information pertaining to the industrial system may be selected to be displayed in the at least semi-transparent layer. The user may thereby be able to monitor parts of the industrial system 3, i.e. those which are visible below the at least semi-transparent layer on the main display means 13, while being provided with relevant industrial system information. Thereby, the user may in a fast and simple way be able to obtain system information which otherwise would require the manoeuvring through a plurality of menus.

In one embodiment, a set of widgets which may be displayed on the main display means 13 may be user-defined. To this end each individual user may define a preferred set of widgets, which are displayed on the main display means 13 when the dashboard application is selected for a specific user.

In one embodiment, one of the additional applications selectable via the secondary display means 11 by toggling left or right according to arrows A-1 or A-2, is a system commissioning or system process start-up application. Different processes may be presented visually e.g. in a step-by-step manner, wherein a user may select each step according to the specific order to be able to start the process. This significantly simplifies the work of an operator, and also provides an intuitive and simple way of performing a system start-up or a process start-up.

When utilizing the system commissioning or system process start-up application, the said application is normally displayed only on the secondary display means 11. Hereto, the main display means 13 is typically a dedicated monitoring display.

The skilled person in the art realizes that the present invention by no means is limited to the examples described hereabove. On the contrary, many modifications and variations are possible within the scope of the appended claims.

What is claimed is:

1. A method of controlling an industrial system by a control system comprising a user interface having a main display arranged to provide a status view of at least a portion of the industrial system and a secondary display enabling user interaction with the industrial system and the main display, wherein the method comprises:
   receiving an alert concerning a status change in a part of the industrial system,
   displaying, on the secondary display, an alert object associated with the part of the industrial system generating the alert,
   detecting a selection of the alert object based on gesture-based user input,
   displaying the alert object on the main display,
   receiving an adjustment command of a parameter via gesture-based user input, the parameter being associated with the part of the industrial system generating the alert,
   adjusting the parameter based on the adjustment command, and
   controlling the part generating the alert based on the adjusted parameter.

2. The method as claimed in claim 1, wherein the adjusting the parameter based on the adjustment command is carried out via the secondary display.

3. The method as claimed in claim 1, comprising displaying on the secondary display a main object representing the industrial system, and altering the appearance of the main object in response to receiving the alert.

4. The method as claimed in claim 3, comprising displaying on the secondary display at least one node in a hierarchical structure in which the main object forms a root thereof, each displayed node being displayed as a result of gesture based navigation in the hierarchical structure, wherein each node represents a part of the industrial system, and the appearance of each node which is related to the part of the industrial system generating the alert is distinct from any node which is not related to the alert.

5. The method as claimed in claim 4, comprising selecting an end node in the hierarchical structure corresponding to the part in the industrial system generating the alert.

6. The method as claimed in claim 4, comprising altering the appearance of any node related to the alert in response to the step of controlling.

7. The method as claimed in claim 1, wherein the secondary display is a touch screen device having multi-touch functionality.

8. The method as claimed in claim 1, comprising magnifying the alert object on the main display by gesture based user-interaction.

9. The method as claimed in claim 8, wherein the magnifying is provided via the secondary display.

10. The method as claimed in claim 1, comprising displaying an at least semi-transparent layer on the main display on top of the status view.

11. The method as claimed in claim 10, comprising displaying, on the at least semi-transparent layer, an application providing information pertaining to the part of the industrial system associated with the alert.

12. The method as claimed in claim 1, comprising displaying an adjustment of the parameter on the main display.

13. A non-transitory computer readable medium storing a computer program, which when executed performs a method of controlling an industrial system by a control system comprising a user interface having a main display arranged to provide a status view of at least a portion of the industrial system and a secondary display enabling user interaction with the industrial system and the main display, wherein the method comprises:
  receiving an alert concerning a status change in a part of the industrial system,
  displaying, on the secondary display, an alert object associated with the part of the industrial system generating the alert,
  detecting a selection of the alert object based on gesture-based user input,
  displaying the alert object on the main display,
  receiving an adjustment command of a parameter via gesture-based user input, the parameter being associated with the part of the industrial system generating the alert,
  adjusting the parameter based on the adjustment command, and
  controlling the part generating the alert based on the adjusted parameter.

14. A control system for an industrial system, which control system comprises:
  an input interface arranged to receive an alert concerning a status change in a part of the industrial system,
  a main display arranged to provide a status view of at least a portion of the industrial system, and
  a secondary display enabling user interaction with the industrial system and the main display, which main display and secondary display form a user interface of the control system, which secondary display is arranged to display an alert object associated with the part of the industrial system generating the alert,
  wherein the control system is arranged to:
    detect a selection of the alert object based on gesture-based user input;
    display the alert object on the main display,
    receive an adjustment command of a parameter via gesture-based user input, the parameter being associated with the part of the industrial system generating the alert;
    adjust the parameter based on the adjustment command; and
    to control the part generating the alert based on the adjusted parameter.

15. The control system as claimed in claim 14, wherein the secondary display is a touch screen device having multi-touch functionality, arranged to detect the gesture-based user input.

16. The method as claimed in claim 1, wherein the gesture-based user input comprises bodily movements detected by a camera.

* * * * *